United States Patent

Sessler et al.

[15] 3,652,932
[45] Mar. 28, 1972

[54] METHOD AND APPARATUS FOR MEASUREMENT OF SURFACE CHARGE OF AN ELECTRET

[72] Inventors: Gerhard Martin Sessler, Summit; James Edward West, Plainfield, both of N.J.

[73] Assignee: Bell Telephone Laboratories, Incorporated, Murray Hill, N.J.

[22] Filed: July 30, 1970

[21] Appl. No.: 59,531

[52] U.S. Cl. ................................................324/72, 324/60
[51] Int. Cl. ..........................................................G01n 31/02
[58] Field of Search ........................................324/60, 72, 62

[56] References Cited

UNITED STATES PATENTS 3,496,461  2/1970  Sessler et al. ..............................324/62

Primary Examiner—Edward E. Kubasiewicz
Attorney—R. J. Guenther and William L. Keefauver

[57] ABSTRACT

Electret surface charge is measured accurately and in a reproducible fashion by supporting an electret between fixed electrodes positioned at a finite distance from the electret, one at ground potential and the other employed as a voltage probe. A conductive shutter is interposed between the electret and the probe. A capacitor connecting the electrodes is discharged and the shutter opened to induce a charge on the probe. This charge is drawn from the capacitor and the voltage thus generated across the capacitor is measured with an electrometer. Since electrode spacing is fixed, repeated measurement yields the same measure and the charges on different samples are directly comparable.

12 Claims, 3 Drawing Figures

INVENTORS G. M. SESSLER
J. E. WEST 3,652,932

METHOD AND APPARATUS FOR MEASUREMENT OF SURFACE CHARGE OF AN ELECTRET

BACKGROUND OF THE INVENTION

This invention has to do with measurement of the electrostatic charge retention of a charged dielectric material, and more particularly, to a technique for obtaining an accurate measurement of the effective surface charge on, and the charge distribution across, an electret and to apparatus that permits the measurement to be made easily and accurately without destruction of the charge. It has for its principal object the evaluation of charge retention of an electret in a fashion that both is reproducible and is nondestructive of the electrical or mechanical properties of the material.

FIELD OF THE INVENTION

Dielectric materials in the form of thin films of various polyesters, such as the one known by the brand name Mylar, various fluorocarbons, such as the one available commercially under the brand name Teflon, polypropylene, and various polycarbonate resins, or the like, are used widely in a variety of electric transducers, and for the fabrication of capacitors, and similar devices. When charged electrostatically, these materials are known as "electrets." To assure a standard of quality for such electrets, it is necessary to know the effective surface charge and the charge distribution of the electret. Several basic methods have been used for determining electret charge strength.

DISCUSSION OF THE PRIOR ART

One method is based on the measurement of the charge induced in a metallic body as it is moved to or away from one surface of an electret. Such induction methods, implemented for example by the well-known dissectible capacitor, are widely used. Electret charge is, by this technique, induced in an electrode and measured in a charge or voltage-sensitive instrument, such as a low-capacity electrostatic voltmeter, an electrometer, or a ballistic galvanometer. Because reproducibility of charge measurement is low, largely because of changes in electrode position, an average of a number of measurements is generally used to obtain a reasonably accurate evaluation. Another procedure makes use of the depolarization of the electret, for example, by the application of heat and the simultaneous measurement of displacement current. This process is capable of providing data that cannot be obtained from induction methods and, therefore, is frequently used even though it destroys the electret. By another technique, measurements have been made by subjecting an electret incorporated in a microphone to sound pressure and to a DC bias of opposite polarity. The bias is then adjusted for a signal output null and surface charge is computed on the basis of a known value of bias necessary to cancel all output signals. The DC bias of opposite polarity results in a deterrent to the electret charge. By yet another procedure, a wafer is vibrated or rotated in the field of an electret while the short circuit alternating current or open-circuit voltage is measured. These quantities are then related to surface charge. Since ideal short- and open-circuit conditions are never achieved in practice, the results must be corrected for circuit parameters.

SUMMARY OF THE INVENTION

In accordance with this invention, measurement of the effective surface charge of an electret is achieved by means of a variation of the first technique discussed above. Measurement is achieved simply and conveniently in a fashion that preserves the electret and yet provides an extremely accurate and reproducible measurement. A static conductive probe is positioned at a finite, constant distance from one surface of an electret. It is connected by way of a shunt capacitor to the input of an electrometer operated in its voltmeter mode and adjusted to exhibit a high input resistance. A film of electret material, preferably framed and often equipped with a metallic coating on one surface, is supported in a taut condition, for example, on a conductive support, such as a ring, with the metallic coating of the electret in contact with the ring. The sample is preferably shielded from external fields. A conductive shutter, preferably maintained at the potential of the conductive support, is interposed between the electret and the probe. Preferably, the shutter is arranged to shield the probe completely from the electret in the closed position and to expose it to the fields generated by the electret surface when in the open position.

Charge measurement is obtained, for example, by positioning the probe assembly in proximity to the electret with the shutter closed and the meter input short-circuited. After removing the short circuit, the shutter is opened. The charge induced in the fixed probe is drawn from the capacitor, or the like, and the voltage thus developed across the capacitor is measured on the meter within a time interval much shorter than the time constant of the connective circuit. The measured voltage is directly related to the surface charge on the electret. Advantageously, the physically static system, in accordance with the invention, permits measurements to be made repeatedly without recalibration. Hence, the technique is faster than known induction systems and is well suited to production applications.

Surface charge can also be measured in accordance with the invention, by short-circuiting the input to the electrometer briefly prior to closing the shutter. The meter reading in this case, except for the sign, is equal to the reading obtained in the method described above if the capacitance of the shutter probe system is negligible. Rather than by operating the shutter, measurement may also be obtained by calibrating the system with the shutter open and by then moving the probe assembly laterally with respect to the surface of the electret, i.e., in or out of the field of the electret. Since the probe to electret spacing is preserved, this arrangement also yields reasonably accurate and reproducible results.

The support table for the electret preferably is mounted on a positioning platform capable of precise movement in two dimensions. Similarly, the probe assembly may be supported for controlled motion in two dimensions. This allows surface charge distribution on an electret to be measured with a small probe, e.g., for mapping the lateral distribution of charge. Similarly, the probe to electret surface spacing is made adjustable to permit electrets of different charge strengths to be measured without the fear of voltage breakdown.

BRIEF DESCRIPTION OF THE DRAWING

The invention, its theory and application, will be better understood from the following description with reference to the drawing in which.

DETAILED DESCRIPTION

In accordance with this invention, the surface charge density of an electret is measured by inducing a charge on a conductive probe, for example, a metal disc, positioned parallel to and at a distance $d_1$ from one of the surfaces of the electret. By choosing $d_1$, much greater than the thickness $d_2$ of the electret, some major difficulties encountered with existing induction methods utilizing electrodes in direct contact with the electret are avoided. At the same time, charging or depolarization phenomena, likely with induction methods which apply a reverse DC bias to the sample, are also eliminated. The invention is applicable to thin electrets, such as film or foil electrets as well as to thick electrets, such as plate electrets. Any of these forms of electret may be metallized on one surface.

A conductive shutter maintained at ground or reference potential, and interposed between the probe and the electret is opened to expose the probe to the electric field of the electret. The probe is connected by way of a shunt capacitance system to an electrometer, or the like. The electret is suspended in proximity to the probe to limit contact of the metallized layer of the electret with the support. Preferably, a switch is employed to discharge the capacitor system prior to measurement.

Figure 1:
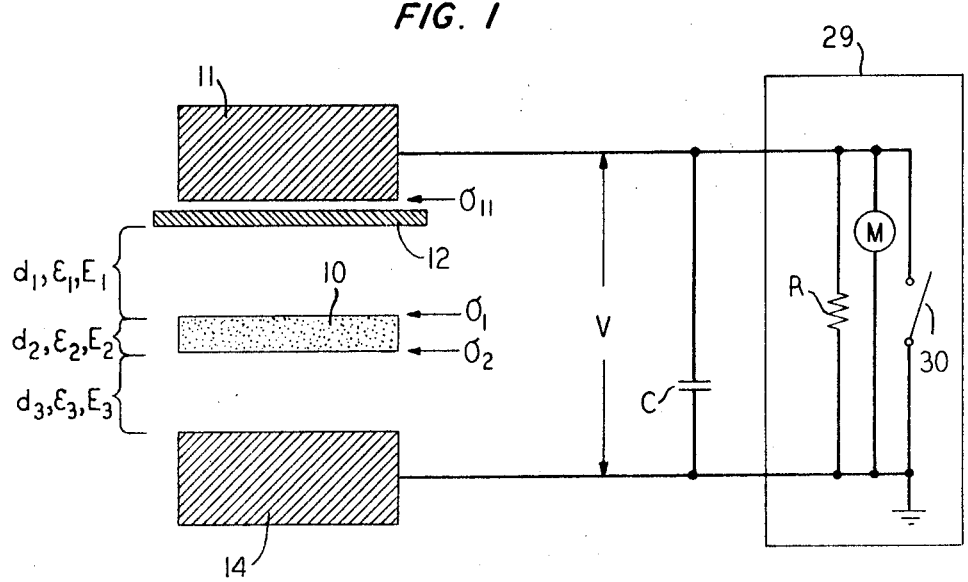
FIG. 1 is a schematic illustration of the relationship between an electret, metallic support, shutter and probe with the associated electrical circuits. In this drawing, $d$ represents distance, $\epsilon$ represents dielectric constant, $\sigma$ represents surface charge, C depicts an external capacitor, R represents the input resistance of an electrometer, and V represents the voltage across capacitor C.

A typical arrangement is illustrated in FIG. 1. Suppose a measurement of the charge retention characteristic of a thin film electret 10 is taken with metallic probe 11 positioned directly opposite to electret 10 by performing the following sequence of operations:

Close shutter 12, close switch 30, open switch 30, open shutter 12, measure voltage V between probe 11 and ground support 14 within a time much less than the time constant (established by R and capacitor system C). Voltage V is thereupon measured, for example, with an electrometer, across C and R. Electret 10 is assumed to have charge densities $\sigma_1$ and $\sigma_2$ on the two surfaces, respectively, and include both real and quasi-permanent bound charges. If there is a finite volume density of charge, it is "projected" to the surface. Projected charges are added into $\sigma_1$ and $\sigma_2$ and the resulting quantities are called the "effective surface charge." After opening shutter 12, the electric field $E_1$ between probe 11 and electret 10 is given by $$E_1 = \frac{[(V/\epsilon_1) + (1/\epsilon_0\epsilon_1\epsilon_2)\sigma_1 d_2 + (1/\epsilon_0\epsilon_1\epsilon_3)(\sigma_1+\sigma_2)d_3]}{\sum_{i=1}^{3}(d_i/\epsilon_i)} \quad (1)$$

In the equation, $\epsilon_o$ represents the permittivity of free space, and the dielectric constants $\epsilon$ are illustrated in FIG. 1. The spacings $d_1$ and $d_3$, as related to the thickness $d_2$ of electret 10, is also depicted in the figure. In practice, it has been found that for foil electrets with a thickness of approximately $10^{-3}$ cm., a distance $d_1$ of approximately 0.5 centimeters is satisfactory.

The induction charge density $\sigma_{i1}$ on probe 11 is related to field $E_1$ by Gauss's theorem $$\sigma_{i1}/\epsilon_o = -\epsilon_1 E_1 . \quad (2)$$

Since the charge $A\sigma_{i1}$ on probe 11, where A represents probe area in square centimeters, is drawn from capacitor C, the initial voltage V across the capacitor is given by $$VC = -A\sigma_{i1} . \quad (3)$$

It is assumed that $$\epsilon_0 A \Big/ \sum_{i=1}^{3}(d_i/\epsilon_i) \ll C \quad (4)$$

The term on the left represents the capacitance formed by electret 10 and the two gaps of thickness $d_1$ and $d_3$. Equation (4) is easily satisfied in practice, since $d_1$ is chosen to be large. By eliminating $E_1$ and $\sigma_{i1}$ from equations (1), (2), and (3), and by using equation (4)

$$V = \left[ A/C \sum_{i=1}^{3}(d_i\epsilon_i) \right] [(\sigma_1 d_2/\epsilon_2) + (\sigma_1+\sigma_2)(d_3/\epsilon_3)] \quad (5)$$

If $d_3$ is zero or much smaller than $d_2$, as for an electret metallized on the lower side, equation (5) can be written $$\sigma_1 = VC(\epsilon_2 d_1 + \epsilon_1 d_2)/\epsilon_1 A d_2 . \quad (6)$$

Since all quantities on the right-hand side of equation (6) are either known or precisely measurable, $\sigma_1$ can be obtained accurately.

Figure 2:
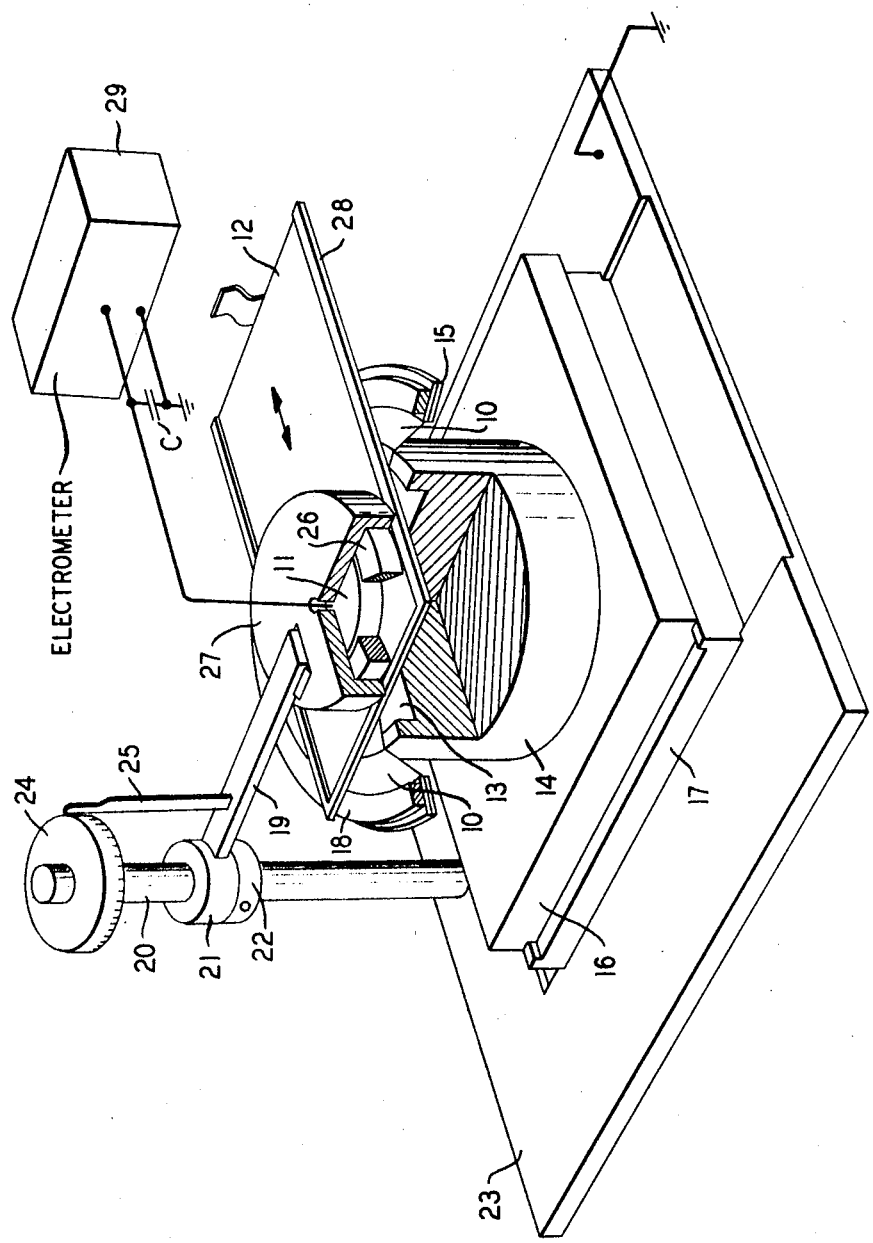
FIG. 2 is a schematic illustration of a charge measuring arrangement which embodies the principles of the invention.

FIG. 2 illustrates apparatus suitable for measuring the effective surface charge of an electret in accordance with the invention. Thin film electret 10 is supported at its periphery by a semirigid frame 15. In practice, a cardboard or plastic ring framing the electret has been found to be satisfactory. The framed electret foil with a diameter typically of 10 centimeters is placed on a cup-shaped support table 14, maintained at reference ground potential, so that contact is made with the metallized surface of the electret only at the edge of the electret inside frame 15. In practice, support table 14 has a recess 13 in its upper surface forming a cuplike opening to a depth of approximately 0.25 centimeters to permit the electret to be positioned properly. Support table 14 may be mounted on a positioning table of any desired construction. For example, a two-element table, including platforms 16 and 17, may be used. Table 17 is, for example, adapted for lateral movement, and table 16 is adapted for movement at right angles to table 17.

Retaining ring 18 may be placed over the outer periphery of frame mounted electret 10 to force the framed electret down on table 14 thus to provide a flat foil surface that is held immobile. Electret 10 is thus tautly held over the cup-shaped support table and maintained in contact with the table only at its outer edge. The cup prevents contact between the table and the area of the electret to be investigated. This is of particular importance for metallized foils.

Probe 11 is supported in proximity to support table 14, for example, by means of arm 19, rotatably attached to mounting rod 20 by means of collar 21 and adjustment lock 22. Rod 20 is firmly attached to mounting plate 23 which also supports support table 14. If desired, a system for indicating the position of probe 11 may be provided by means of a disc 24 affixed to rod 20 and an indicator probe 25 affixed to movable probe mounting 19. With this arrangement, probe 11 may be rotated about rod 20 and raised and lowered as desired to obtain correct positioning with regard to the electret.

Preferably, a number of different disc-shaped probes with diameters ranging from 0.03 centimeters to approximately 10 centimeters (not illustrated) are used interchangeably in order that the surface charge of the electret may be measured either in its entirety or at selected subarea locations.

Guard ring 26 circumscribes probe 11 with its lower surface in a plane with the lower surface of the probe. Preferably, it is maintained at the potential of probe 11, using any of the techniques well known in the art. Both probe 11 and guard ring 26 are covered by a conductive housing 27, preferably held at reference or ground potential. Housing 27 thus constitutes a shield to guard against external fields. In the embodiment illustrated, the lower surface of shield 27 is in the plane of the probe surface. Alternatively, housing 27, held at ground potential, may be used to function as a guard ring, thus eliminating the need for ring 26. With this construction, however, there is a slight potential difference between the probe and guard which will give rise to a small measuring error.

Shutter 12, slidably supported in proximity to probe 11, may be closed to shield probe 11 completely from outside fields. When shutter 12 is removed, as by slidably withdrawing it from a frame 28 or the like, or rotating it out of the area between probe 11 and electret 10, the front surface of probe 11 is exposed to the electric field of electret 10.

Probe assembly 11, shutter 12, and support table 14, are preferably coated with a clean layer of nonoxidizing metal to avoid space charges on deposits and oxide layers.

Probe assembly 11 is connected to the input of an electrometer 29 used in its voltmeter mode and set at maximum input resistance. In practice, an input resistance in excess of $10^{14}$ ohms is preferred. This input impedance and other voltmeter characteristics are found in the Keithley model 615 digital electrometer. This instrument also includes switch 30 as an integral part of its operation. The input of electrometer 29 is shunted by a capacitor C of a known value, typically a few hundred picofarads. In practice, capacitor C includes the capacitance of the connecting cable as well as the input capacitance of meter 29. Thus, the RC-constant of the connecting system is on the order of $10^4$ seconds. For measuring high-charge densities, i.e., those greater than $10^{-6}$ C/cm.$^2$, additional shunt capacitance can be used to extend the range of the meter. Switch 30 is used to short circuit the capacitance and the meter input to remove residual charges prior to a measurement. Experience has shown that measurements made as described above are effective for surface charge densities on foil electrets within a useful range of about $10^{-10}$ to about $10^{-6}$ C/cm.$^2$. For a surface charge density of $10^{-8}$ C/cm.$^2$, the reproducibility error has been found to be about 1 percent with systematic errors equally low.

As discussed above, the charge on electret 10 can also be measured by short circuiting the input to electrometer 69 briefly prior to closing shutter 12 from its open position.

Another important application afforded by the invention is the ability to map the lateral charge distribution of an electret. Mapping is achieved by employing a relatively small probe, comparable in size to the detail required in the mapping process, and by moving the table supporting the electret, or the probe arm (provided that the arm is arranged for adjustment both laterally and radially), to move the probe systematically relative to the electret. Charge density in a two-dimensional matrix of locations on the electret is indicated by the metering system, thus to indicate nonuniformities in charge density. Due to the long RC time constant of the capacitor-meter combination, consecutive readings can be made without repeatedly zeroing the meter, without actuating the shutter, and without changing the distance between probe and electret.

Numerous advantages accrue from use of the arrangement illustrated in FIG. 1. By choosing $d_1$ large as compared to the dimension $d_2$ of the electret, the value of $d_1$ is laterally uniform, is independent of the electret charge, and can be measured macroscopically. Thus, there is a linear relationship between measured voltage and effective surface charge. This is in contrast to the dissectible-capacitor method utilizing electrodes in direct contact with the electret. When the electrode is in contact with the electret, a nonuniform air gap forms which has an average thickness of a few microns. Because of attraction between electret and electrode, the air gap depends also on the degree of surface charge on the electret layer. Moreover, the dissectible-capacitor technique requires that a separate calibration be made for every measurement. Even with constant recalibration, accuracy suffers because of the nonuniformity of the air gap.

Figure 3:
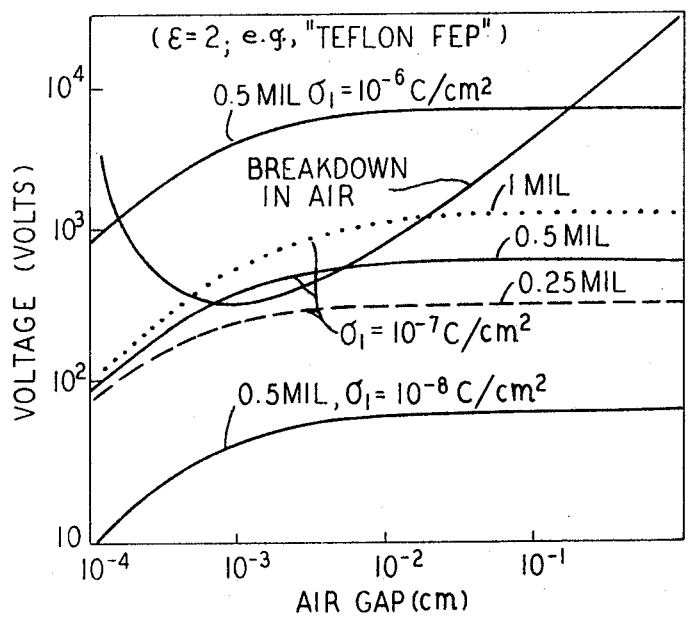
FIG. 3 depicts voltage across the air gap in a typical measurement arrangement as a function of air gap thickness for electret materials, e.g., with $\epsilon=2$, of different thicknesses and surface charges.

Further advantages are gained by use of this invention particularly at very low and very high charge levels. Low level measurements can be accurately performed because of the absence of contact phenomena that may be of importance when using the dissectible-capacitor technique. At high charge levels, breakdown across air gap $d_1$ may be caused by excessive values of voltage $V_g = E_1 d_1$. This voltage is determined from equation (1) for $d_3=0$ as $$V_g = E_1 d_1 = \sigma_1 d_1 d_2 / \epsilon_o (\epsilon_2 d_1 + \epsilon_1 d_2), \quad (7)$$

where $V \ll \sigma_1 d_2/\epsilon_o \epsilon_2$ (from equations (4) and (6)) has been used. Voltage $V_g$, computed with equation (7), as a function of air gap thickness $d_1$, is illustrated in FIG. 3 for a variety of electret thicknesses $d_2$ and surface charges $\epsilon_1$, assuming $\epsilon_1=1$ (for air) and $\epsilon_2=2$ (for Teflon). FIG. 3 also illustrates the electrical breakdown characteristic between parallel flat plates in air at atmospheric pressure. As indicated, breakdown in the air gap occurs readily with the dissectible-capacitor method for $\sigma_1 \approx 10^{-7}$ C/cm.$^2$ when the electrode approaches its contacting position ($\overline{d}_1 \approx 10^{-4}$ cm.). On the other hand, no breakdown occurs for surface charges up to $10^{-6}$ C/cm.$^2$ when using the present invention with air gaps of about 0.5 cm. This is of particular interest since new breakdown charging techniques yield initial surface charge densities of this order.

Due to the presence of a finite air gap $d_3$, established by virtue of the cuplike depression 13 in support table 14, measurements on nonmetallized foil electrets are generally less accurate than measurements on metallized foil electrets. In accordance with the invention, however, the net charge $\sigma_1+\sigma_2$ of foil electrets may be determined quite accurately from equation (5) by choosing $d_3 \gg d_2$. It is also possible to determine the individual charge densities $\sigma_1$ and $\sigma_2$ with this technique, provided that $d_3$ is selected to be much smaller than $d_2$.

What is claimed is:

1. Apparatus for the measurement of the surface charge of an electret, which comprises,
    first and second electrodes fixedly supported in juxtaposition to one another, the first held at reference ground potential and the second being coupled as a probe to ground by a capacitive system,
    means for supporting a film electret between said electrodes,
    conductive shutter means interposed between said probe electrode and said supported electret,
    means for selectively discharging said capacitive system,
    means for systematically withdrawing said conductive shutter means from said interposition, thereby to permit a charge to be induced, by virtue of said electret charge, on said probe electrode and drawn from said capacitive system, and
    means for measuring the voltage developed in said capacitive system.

2. Apparatus as defined in claim 1, wherein,
    said probe electrode has a surface area coextensive with the area of said electret that overlays said first electrode.

3. Apparatus as defined in claim 1, wherein,
    said probe electrode has a surface area substantially smaller than the area of said electret that overlays said first electrode.

4. Apparatus as defined in claim 1, wherein,
    said probe electrode, said shutter, and said first electrode are coated with a layer of nonoxidizing metal to avoid the accumulation of erratic space charge thereon.

5. Apparatus as defined in claim 1, wherein,
    said film electret is supported at its periphery by a semirigid frame.

6. Apparatus as defined in claim 1, wherein,
    said first electrode has a recess in the form of a cuplike depression in its surface juxtaposed to said probe electrode.

7. Apparatus as defined in claim 1, wherein,
    said first electrode and said probe electrode are adjustably mounted so that they may be fixedly supported in juxtaposition with prescribed amounts of overlap and separation.

8. Apparatus for the measurement of surface charge on a film electret, which comprises:
    an annular conductive support maintained at a first potential,
    a conductive probe spaced apart from and held in fixed relation to said conductive support,
    capacitor means interconnecting said probe and said support,
    means for tautly holding an electret in contact with said annular support,
    a movable conductive shutter held at said first potential and supported intermediate said probe and said electret for electrically shielding said probe from said electret in a first position and for exposing said probe to said electret in a second position, said shutter having an area at least equal to the area encompassed by said probe, and
    means for measuring charge accumulated on said capacitor means upon the transfer of said shutter from said first position to said second position.

9. Apparatus for the measurement of surface charge on a film electret, which comprises:
    a conductive ring maintained at a first potential, a shielded plane conductive probe spaced apart from and held in fixed relation to said conductive ring, capacitor means interconnecting said probe and said ring, means for tautly holding a metallized thin film electret in contact with said ring support, a movable conductive electrode held at said first potential and supported intermediate said probe and said electret for electrically isolating said probe from said electret in a first position and for exposing said probe to said electret in a second position, said movable electrode having an area at least equal to an area coextensive with said ring support, and means for measuring charge accumulated on said capacitor means upon the transfer of said shutter from said first position to said second position.

10. The method of measuring the surface charge on an electret supported between first and second electrodes, which comprises the steps of:

interposing a conductive shield between the electret and the first of the electrodes, said shield being maintained at the potential of said second electrode, momentarily electrically interconnnecting said electrodes, withdrawing the shield to expose said one electrode to the charge on the electret, accumulating the charge thereby induced in said one electrode from said electret in a capacitor system, and measuring the charge accumulated in said capacitor system within the time constant of said capacitor system.

11. The method of measuring the surface charge on an electret supported between a pair of electrodes, which comprises the steps of:

exposing one electrode to the field of an electret, interposing a conductive shield between the electret and one of the electrodes, accumulating the charge induced in said one electrode from said electret as a result of said interposition in a capacitor system, and measuring the charge accumulated said capacitor system within the time constant of said capacitor system.

12. The method of mapping the lateral charge distribution of an electret, which comprises the steps of:

supporting an electret between a fixed electrode having an area at least coextensive with the area of the electret, and a probe electrode having an area comparable to the smallest area of detail required for said map, interposing a conductive shield between the electret and said probe electrode, momentarily bringing said fixed electrode and said probe electrode to the same potential, withdrawing the shield to expose said probe electrode to the charge on the underlying area of the electret, accumulating the charge induced in the probe electrode from the electret area in a capacitor system, measuring the charge accumulated in the capacitor system within the time constant of the capacitor system, progressively moving said probe electrode laterally over the surface of said electret, and repeatedly measuring the charge on said capacitor system within the time constant thereof for each area of said electret underlying said probe.

* * * * *